(12) United States Patent
Brong et al.

(10) Patent No.: US 8,570,678 B2
(45) Date of Patent: Oct. 29, 2013

(54) DETERMINING TAPE HEAD CONDITION (75) Inventors: Brian Brong, Eagle, ID (US); Mike Alan Holmberg, Eagle, ID (US); Steven L. Brittenham, Boise, ID (US); Michael Anthony Ellis, Boise, ID (US); Saiman Kusin, Boise, ID (US); Geoff Spratt, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 145 days.

(21) Appl. No.: 13/299,602

(22) Filed: Nov. 18, 2011

(65) Prior Publication Data
US 2013/0128371 A1 May 23, 2013

(51) Int. Cl.
G11B 27/36 (2006.01)
G11B 21/02 (2006.01)

(52) U.S. Cl.
USPC .............................................. 360/31; 360/75

(58) Field of Classification Search
None
See application file for complete search history.

(56) References Cited

U.S. PATENT DOCUMENTS

| | | | |
|---|---|---|---|
| 7,277,246 B2 | 10/2007 | Barbian | |
| 7,467,274 B2 | 12/2008 | Neufeld | |
| 7,657,826 B2 * | 2/2010 | Imamura et al. | 714/799 |
| 7,908,526 B2 | 3/2011 | Guha | |
| 2005/0152055 A1 | 7/2005 | Biskeborn | |
| 2008/0148825 A1 * | 6/2008 | Liang | 73/105 |
| 2009/0027805 A1 | 1/2009 | Saito | |
| 2009/0161243 A1 | 6/2009 | Sharma | |
| 2011/0131140 A1 | 6/2011 | Groel | |

FOREIGN PATENT DOCUMENTS

JP   9043130   2/1997

* cited by examiner

*Primary Examiner* — Regina N Holder
(74) *Attorney, Agent, or Firm* — Francisco Javier Rubio Sierra (57) ABSTRACT

Techniques to use a model associating condition of a tape head with tape head usage are described. The tape head is for use in a magnetic tape drive. In examples, a condition of the tape head is determined using a model. In examples, the model fits determined values of the condition parameter.

20 Claims, 6 Drawing Sheets

DETERMINING TAPE HEAD CONDITION

BACKGROUND

Current storage of computer data is implemented in a vast variety of applications. One technique for storing computer data is to record the data in a tape cartridge using a tape drive. For example, data may be recorded on and read from a moving magnetic tape with an electromagnetic read/write head (also referred to as tape head) positioned next to the magnetic tape. Generally, tape storage offers a favorable unit cost and long archival stability. Therefore, an application of tape drives is long term storage of data for backing up computer data as a measure of protection against data loss.

One key component of tape storage is the tape head. During operation for reading or writing data, a tape head may suffer wear (e.g., a pole tip recession), which typically influences condition of the tape head. For example, wear of the tape head generally limits the operating life of the tape head. Operating life refers to the usage period of time during which a tape head can read and/or write data with acceptable reliability.

DETAILED DESCRIPTION

In the following description, numerous details are set forth to provide an understanding of the examples disclosed herein. However, it will be understood by those skilled in the art that the examples may be practiced without these details. Further, in the following detailed description, reference is made to the accompanying figures, in which various examples are shown by way of illustration. In this regard, directional terminology, such as "top," "bottom," "front," "back," "left," "right," "vertical,", "upper," "lower," etc., is used with reference to the orientation of the figures being described. Because disclosed components can be positioned in a number of different orientations, the directional terminology is used for purposes of illustration and is in no way limiting. Like numerals are used for like and corresponding parts of the various figures.

While a limited number of examples have been disclosed, it should be understood that there are numerous modifications and variations therefrom.

Currently, for estimating the operating life of a tape head, a test tape head may be tested for a certain number of cartridges, e.g. 200 cartridges. The condition of the test tape head after the test may be determined for assessing an operating life of tape heads in the same design class. However, such test may be time-consuming and expensive. Further, events occurring during the operating life of a particular tape head (e.g. using a cartridge type different than tested) may influence the operating life of the tape head. Generally, a tape head test as described above may not take into account such events. Below are described techniques that determine tape head conditions.

Figure 1:
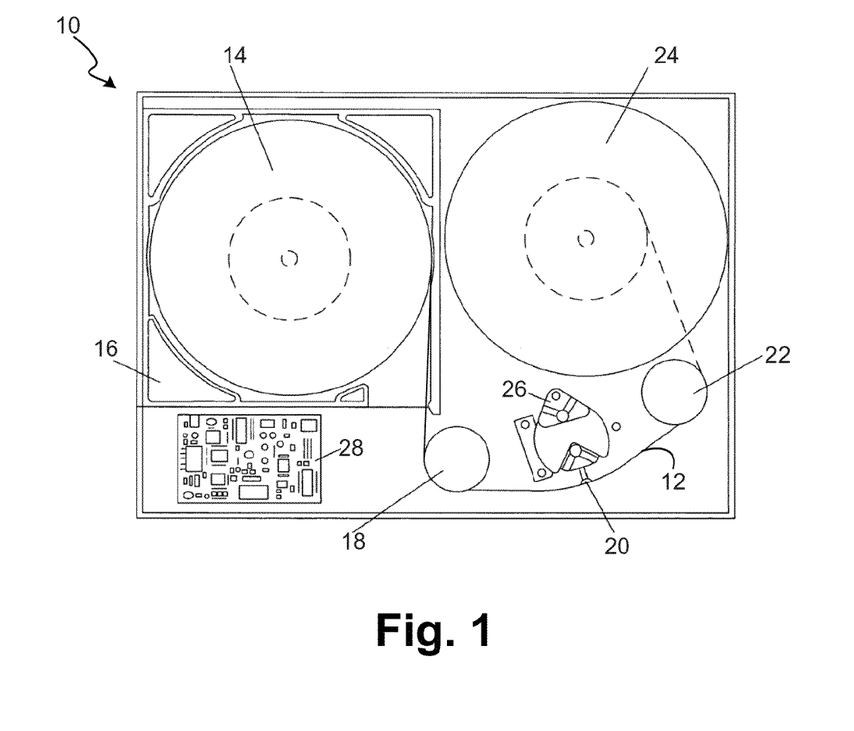
FIG. 1 is a schematic representation of a tape drive according to an example.

FIG. 1 is a schematic representation of a tape drive 10 according to an example. A magnetic tape 12 is initially wound on a supply reel 14 within a magnetic-tape cartridge 16. When loaded into magnetic-tape drive 10, a mechanism (not shown) opens cartridge 16, grasps a leader pin (not shown) mounted to a leader portion of tape 12, and threads tape 12 around a first guide roller 18, over a tape head 20, and around a second guide roller 22 to a take-up reel 24. Generally, tape head 20 includes an array of read/write elements (not shown) that write data to, and read data from, tape 12. Tape head 20 may be moved in a vertical direction (i.e., normal to the plane of the drawing) by an actuator 26 in order to access different sets of tracks for reading and writing.

Actuator 26 is, in turn, controlled by a tape-drive controller 28 that includes one or more processors, electronic memory, and logic circuitry. Functions performed by tape-drive controller 28 include, among others, receiving data from, e.g., an external host computer system, processing the data into data sets, writing the data sets to the magnetic tape by electromechanical control of tape head 26, reading data sets from magnetic tape 12 by electromechanical control of tape head 26, processing the data sets to retrieve the host data that is returned to the host computer system, or determining a condition of tape head 12.

Condition of tape head 20 may vary over tape head usage. As used herein, condition of the tape head refers to the state of the tape head related to its readiness for being used with a sufficient reliability. A parameter related to tape head performance may be indicative of a condition of tape head 20. Generally, such a condition parameter corresponds to a characteristic of the tape head influencing performance of the tape head, i.e. the execution of read and/or write operations by the tape head. For examples a condition parameter may be associated with a tape head parameter such as a tape head wear, a magnetic spacing, or an error rate. Examples of condition parameters include tape head wear rate, magnetic spacing change, error rates, or a resistance of the tape head. Tape head wear refers to erosion of the tape head due to its interaction with the tape during read/write operations. Magnetic spacing corresponds to the spacing derived from the Wallace equation. Error rate drift refers to the increment over usage of errors (e.g., bit errors or block errors) performed by a tape head in reading data from a tape. Resistance of the tape head refers to an electrical resistance of an element of the tape head exposed to wear, such as a read element. As will be understood, at least some of these parameters are interrelated. For example, as further detailed below with respect to FIG. 9, wear of a tape head may induce magnetic spacing change, error rate drift, or tape head resistance.

Figure 2:
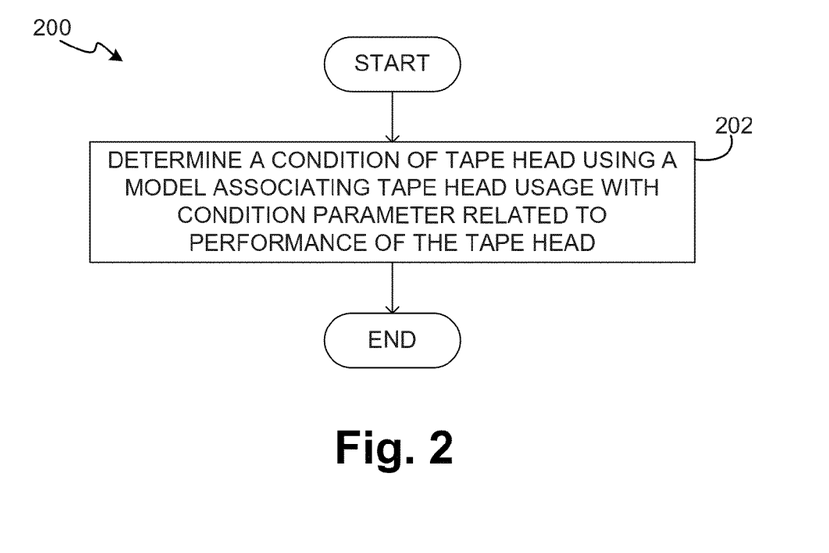
FIG. 2 is a diagram depicting a process flow for predicting a condition of a tape head according to an example.

A predicted tape head condition may be used for assessing when a tape head should be exchanged so as to avoid reliability problems with the tape head. FIG. 2 is a diagram depicting a process flow 200 for predicting a condition of a tape head for a magnetic tape drive according to an example. Process flow 200 may be carried out by execution of sequences of executable instructions through a processor as further detailed below with respect to FIGS. 4A and 4B. At block 202, a condition of the tape head is determined using a model. The model associates a condition parameter with tape head usage. Such a model is a simplified mathematical or numerical representation of the tape head through an association of a particular condition parameter (for example wear) with tape head usage. Such a model facilitates determining tape head condition after a specific tape head usage.

The model fits determined values of the condition parameter. Generally, the model includes a curve, or mathematical function, constructed by finding a function based on a parameterized function that has the best fit to a series of determined test values. Construction of the wear model may involve smoothing, in which a "smooth" function is constructed that approximately fits the determined test values. Smoothing may include, for example, a least square fitting method.

A determined value may be directly measured or derived from a measurement of a related condition parameter. For example, a model may be constructed that fits values of wear rates. By way of example, the wear rate values may be determined "ex situ", e.g., by a direct topography measurement such as atomic force microscopy. Another option is to determine wear "in situ", e.g., by using an online measurement such as a measurement of magnetic spacing, error rate, tape head resistance. Multiple measurements may be combined for determining a value of a condition parameter. It will be understood that process flow 200 does not necessary include fitting a parameterized function; for example, process flow 200 may be carried out using a pre-determined model. Alternatively, or in addition thereto, process flow 200 may include acquiring test values of a condition parameter (e.g., wear, magnetic spacing change, or error rate drift) and fitting a parameterized function, as further detailed below with respect to FIGS. 5A to 7B.

Figure 3:
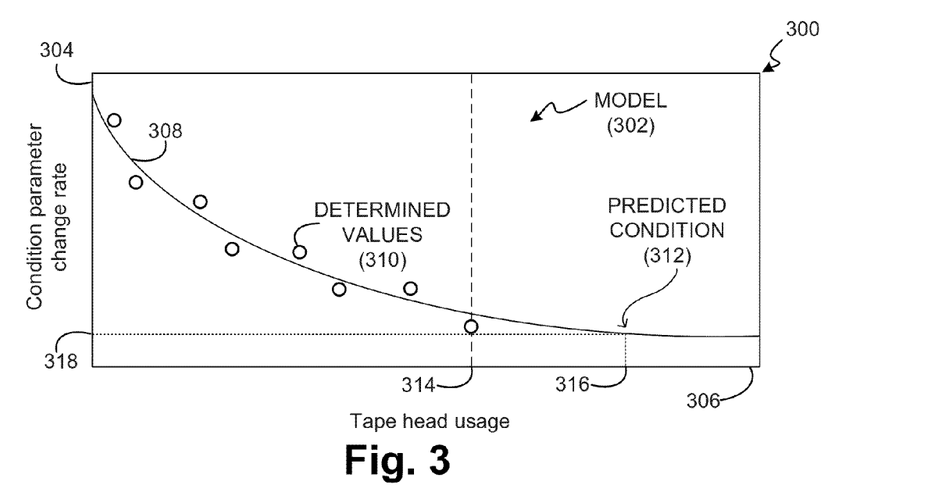
FIG. 3 is a graph schematically showing a model fitting values of a condition parameter according to an example.

Looking ahead to FIG. 3, a graph 300 schematically shows a model 302 that associates a rate of change of a condition parameter with tape head usage. Model 302 may be constructed for a tape wear rate. Tape wear rate refers to a rate of tape head material removal due to wear per unit of exposure parameter (e.g., a number of written/read cartridges, a length of written/read tape, or time of operational use). Model 302 is constructed by fitting a curve 308 to determined values 310. Note that the values of the condition parameter change rate may decrease over usage. For example, tape head wear rate generally decreases over usage since wear typically increases the tape-to-head distance. Further, a higher tape-to-tape head distance reduces contact between tape and head and, consequently, results in a reduction of wear rate. Rates associated with other condition parameters may analogously vary over usage. For example, the longer the usage of a tape head, the slower a rate at which magnetic spacing or error rate change over time.

Determined values 310 may be measured by removing the test head from a magnetic tape drive and performing a suitable measurement method. For example, tape head wear may be measured using atomic force microscopy. Note that tape wear generally only affects a specific portion of the tape head such as the portion arranged to be proximal to the tape during read/write operations. Therefore, wear may be established by comparing portions subject to wear and portions of the tape head not exposed to tape contact. For example, pole tip recession, linked to tape head wear, may be determined by comparing a height measurement at the pole and a height measurement at a tape bearing surface of the tape head. Further, wear data may be derived using a magnetic spacing measurement as further detailed below with respect to FIG. 9.

According to some examples herein, a model as described above is constructed by fitting the following parameterized function with determined values of a condition parameter:

$$y = Mx^{-p},$$

wherein y corresponds to a cumulative rate of a condition parameter (e.g., a cumulative wear rate, a cumulative magnetic spacing change rate, a cumulative rate in tape head resistance, or a cumulative error rate drift increase), x corresponds to tape head usage 306, and M and p corresponds to parameters for fitting the parameterized function. Using model 302, a condition 318 of a tape head can be predicted. More specifically, a future condition 318 can be predicted by extrapolating fitted curve 308 to a tape head usage 316 at a point 312 of curve 308 beyond tape head usage 314 of experimentally determined data. It will be understood that predicted values of a condition parameter using model 302 will likely result in an approximation.

Model 302 can be used for assessing the operating life of tape heads in the same design class. For example, as further detailed below with respect to FIGS. 5A and 5B, model 302 may be pre-determined by fitting a parameterized function with test values of a condition parameter determined during a test procedure performed on a test tape head suitable for characterizing the design class. An expected operating life of the tape head may be estimated by determining a tape head usage 316 corresponding to a threshold rate 318 of the condition parameter (e.g., a threshold value of the wear rate beyond which tape head is considered not reliable). Thereby, a drive warranty life can be established during, for example, manufacturing of a particular tape drive design class by testing a test tape drive representing the design class. Such a drive warranty life may also be established dynamically (i.e., during the operating life of a tape head) by performing online measurements related to performance of the tape head (e.g., wear, magnetic spacing or error drift) of a particular tape head, and constructing model 302 using the online measured data. Thereby, the operating life can be established specifically for a tape head. Further, an estimation of the operating life can be updated using new acquired data related to tape head performance. Online measurements are illustrated below with respect to FIGS. 8 and 9.

A model as described above, for example model 302, can be used for determining an abnormal condition of a tape head. For example, model 302 can be constructed using a test data head as set forth above. (Alternatively, or in addition thereto, model 302 may be constructed using values of a condition parameter determined during the operating lifetime of the data head itself.) Then, further condition data may be determined online and compared to model 302. Actual condition data that excessively deviates from wear model 302 (e.g., a distance to curve 308 is higher than a threshold distance) may be indicative of an abnormal condition of tape head. Such abnormal condition may be caused, e.g., by use of a non-standard tape cartridge or by a malfunctioning of the tape drive system. Further examples for determining an abnormal condition of a tape head are detailed below with respect to FIGS. 6A to 7B. Online measurement of condition data for validation of a model associating condition with usage facilitates pro-actively anticipating failure of a tape head, even when events occurring during the operating life influence the initially expected operating life of the tape head.

Figure 4A:
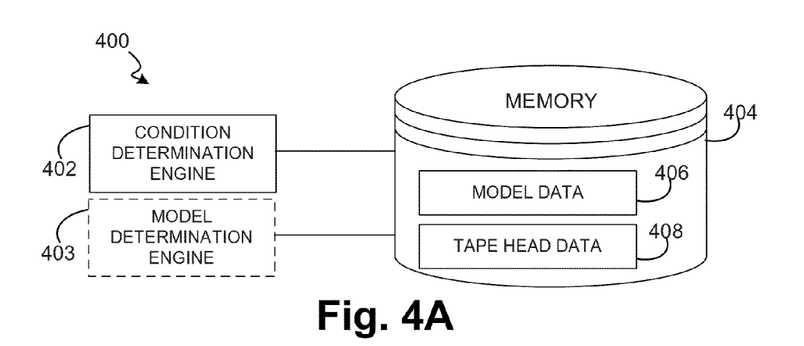
FIG. 4A depicts a system according to an example.

FIGS. 4A and 4B depict physical and logical components for implementing various examples. FIG. 4A depicts a system 400 for predicting condition of a tape head. In the example, system 400 includes a condition determination engine 402 and, optionally, a model determination engine 403. Condition determination engine 402 represents, generally, any combination of hardware and programming configured to determine a condition of a tape head using a model associating a condition parameter with tape head usage. Condition determination engine 402 performs this task by executing tasks associated with, for example, process flow 200 (see FIG. 2) or process flow 700 (see FIG. 7A). Condition determination engine 402 may access data related to a model in data store 404 forming part of model data 406. A specific model may be associated with a specific tape head using data stored in tape head data 408.

Model determination engine 403 represents, generally, any combination of hardware and programming configured to determine and/or modify a model as described herein. Model determination engine 403 may perform this task by executing, for example, process flows 500, 600 detailed below with respect to FIGS. 5A-6B. Model determination engine 403 may cause storing of data associated with a determined model in data store 404 as part of model data 406.

Figure 4B:
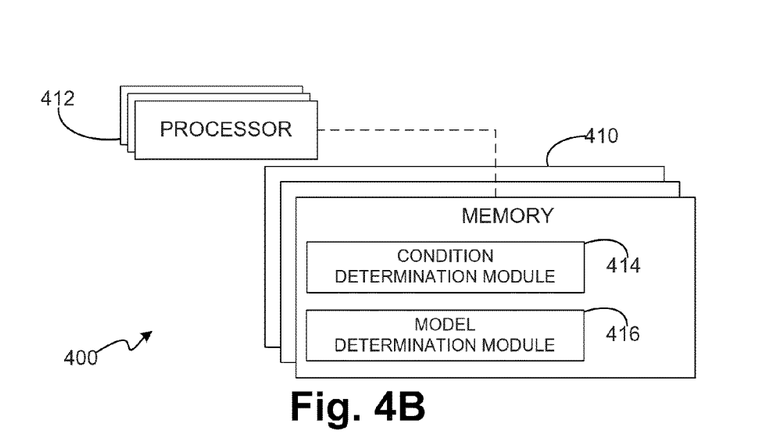
FIG. 4B is a block diagram depicting a computer readable medium according to an example.

Looking at FIG. 4B, the programming referred to above with regard to condition determination engine 402 may be processor executable instructions stored on a tangible memory medium 410 and the hardware may include a processor 412 for executing those instructions. Memory 410 can be said to store program instructions that, when executed by processor 412, implement system 400 of FIG. 4A. Memory 410 may be integrated in the same device as processor 410 or it may be separate but accessible to that device and processor 412.

In one example, the program instructions can be part of an installation package that can be executed by processor 412 to implement system 400. In this case, memory 412 may be a portable medium such as a CD, DVD, or flash drive or a memory maintained by a server from which the installation package can be downloaded and installed. In another example, the program instructions may be part of an application or applications already installed. Here, memory 410 can include integrated memory such as a hard drive.

In FIG. 4B, the executable program instructions stored in memory 410 are depicted as condition determination module 414 and an optional model determination module 416. Condition determination module 414 represents program instructions that, when executed, cause the implementation of condition determination engine 402. Model determination module 416 represents program instructions that, when executed, cause the implementation of model determination engine 403.

System 400 may be deployed as part of a system for manufacturing tape heads and may be used for facilitating determination of a tape head model valid for a design class of tape heads. In another example, system 400 forms part of a tape drive. For example, system 400 may form part of controller 28, shown in FIG. 1. More specifically, condition determination engine 402 may be implemented as part of a driver software for a tape drive. In other examples, system 400 is deployed independently from a manufacturing system or a tape drive. In such cases, system 400 may be communicatively coupled with the manufacturing facility or the tape drive for (i) receiving data associated with a tape drive, (ii) performing a method such as described herein using the received data, and/or (iii) communicating a result related to the determined condition of a data head. For example, in such cases, system 400 may communicate an expected operating life of a tape head or cause signaling of an abnormal condition of the tape head. It will be understood that condition determination engine 402 and model determination engine 403 may be deployed in different computing systems. For example, a condition determination engine deployed in a computing system may access data associated with a model independently generated by a model determination engine deployed in another computing system. It is also contemplated a system comprised of model determination engine 403 with access to a data store for storing data associated with a determined wear model.

As set forth above, a model may be pre-determined by fitting a parameterized function with values of a condition parameter determined during a test procedure performed on a test tape head. The test procedure includes writing data on a plurality of fresh tapes using the test tape head. The test data may include cumulative rates (e.g., a cumulative wear rate) determined at selected intervals during the test procedure. These examples are illustrated with respect to FIGS. 5A and 5B.

Figure 5A:
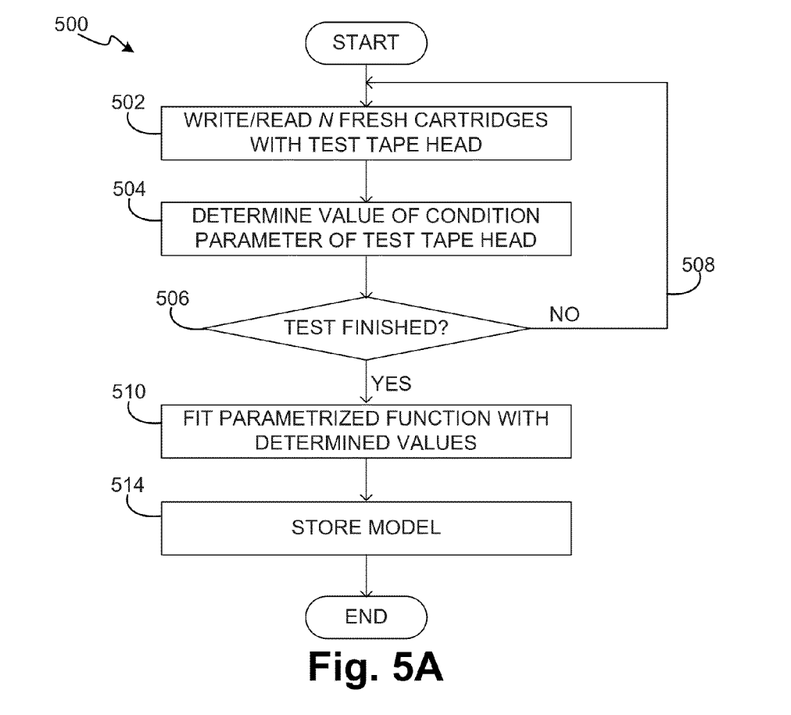
FIG. 5A is a diagram depicting a process flow for testing a test data head according to an example.
Figure 5B:
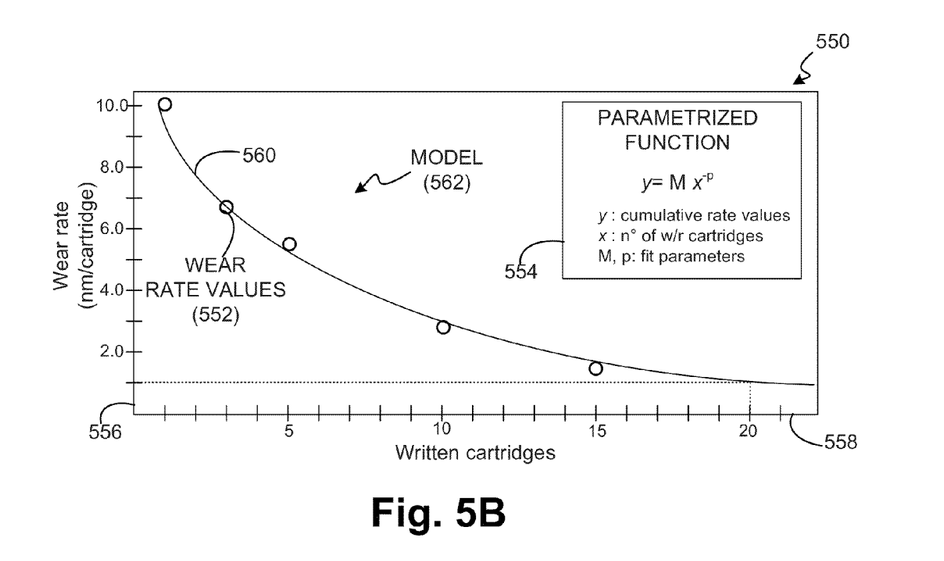
FIG. 5B is a graph schematically showing a model fitting values of a condition parameter to an example.

FIG. 5A is a diagram depicting a process flow 500 for testing a test data head according to an example. The depicted process flow 500 may be carried out by execution of sequences of executable instructions. In an example, the executable instructions are stored in a tangible machine readable storage medium such as, but not limited to, memory device 410. Process flow 500 may be carried out by processor 412. Model determination engine 403 may be responsible for implementing process flow 500. Process flow 500 may be carried out associated with manufacturing of tape drives so as to determine a model associating condition with usage for a specific design class of tape heads. Further, a life expectancy of the tape drives may be determined for a particular design class using such a model. In the following, process flow 500 is described with reference to elements depicted in FIG. 5B, which depicts a graph 550 schematically showing a wear model 562 fitting determined test wear data 552 according to an example. Although FIG. 5B illustrates a model of tape head wear as condition parameter, it will be understood that process flow 500 may be analogously performed for determining models associating other condition parameters (e.g., magnetic spacing change or error rate drift) with tape head usage.

At block 502, a selected number N of fresh cartridges are written and read using a test tape head. More specifically, block 502 may include performing a full volume write operation while reading the written data (read-while-write operation). A test tape head refers to a tape head representative for a design class of data heads. A fresh cartridge refers to a cartridge that have not already been run in a drive or been stressed by other qualification testing. The number N of cartridges generally depends on the generation of media and drive. For example, the number N of written/read cartridges at block 502 may be a number between one and ten or, more specifically a number between two and six such as three.

Block 502 may be performed at an operating environment, such as an environment at a temperature of 22° C. (±5° C.) and at a relative humidity of 50% (±10%). Block 502 is generally performed under the following requirements: (i) no permanent errors should be found during writing and reading; (ii) written data should not be below native capacity as defined by the format of the written/read cartridge; and (iii) drive performance, e.g. bit error rate, block error rate, SNR, rewrite rate, or the like, should remain acceptable at the end of the test.

Block 502 as describe above is sometimes referred to as a full volume green tape test. Implementing block 502 in process flow 500 facilitates constructing a model associating tape head condition with tape head usage that reproduces typical wear of tape heads performing backup and restore operations using, primarily, brand new cartridges. It should be noted that block 502 as described above facilitates collecting measured data in a "worst case scenario" since fresh cartridges are generally more abrasives than used cartridges. Alternatively to block 502 described above, the test tape head may write and read the same cartridge a selected number N of times. Such test is also referred to as full volume life test. Implementing a full volume life test in process flow 500 facilitates constructing a model associating tape head condition with tape head usage that reproduces typical wear of tape heads performing backup and restore operations using, primarily, the same cartridge.

At block 504, a value of the condition parameter is determined after performing a write/read operation as described above. For example, a cumulative wear rate may be determined. Cumulative wear rate refers to the rate of total differential wear. For example, cumulative wear rate may be determined by dividing the total differential wear by tape usage (e.g., number of written cartridges). A cumulative rate of a condition parameter may be seen as a running average of the condition parameter. Cumulative wear rate may be determined by removing the test tape head from the magnetic tape drive after block 502 is finished (i.e., after a particular usage period). Then cumulative wear rate may be determined by determining the total differential wear produced during execution of block 502 using a suitable surface analysis method.

Atomic force microscopy (AFM) is an example of such a suitable surface analysis method. In particular, AFM is a convenient method to measure topographies, from which a cumulative wear rate can be inferred. For example, pole tip recession of the tape head may be measured using AFM as described in, for example, "Pole tip recession in linear tape heads: Measurement technique and influence of head materials, tape speed and tape tension" by Scott et al. in Journal of Engineering Tribology, February 1999, vol. 213, pp. 139-150.

Alternatively, or in addition thereto, cumulative rates of wear or other condition parameters may be determined without removing the test tape head from the magnetic tape drive after block 502 is finished. That is, condition parameters may be determined online, i.e. with the tape head in the magnetic drive. For example, a cumulative wear rate may be determined using a magnetic spacing measurement, analogously as described below with respect to FIG. 9. Further a magnetic spacing measurement may be used for directly constructing a model associating magnetic spacing with tape head usage. Further, an error rate drift may be determined by reading a standardized tape head and registering read errors. A determined error rate drift may be used for directly constructing a model associating error rate drift with tape head usage. Other examples of condition parameters include channel signal-to-noise ratio (CSNR), broadband signal-to-noise-ratio (BB-SNR), or read element resistance.

At block 506, it is evaluated whether a further determination according to blocks 502, 504 is to be completed. Generally, the number of determined values is chosen depending on the desired accuracy for predicting condition of the tape head. A model can be constructed with at least two determined values. Acquiring between three and eight determined values, such as five, generally facilitates constructing a wear model with a sufficiently high reliability. Looking ahead at FIG. 5B, graph 550 includes five determined values 552 of cumulative wear rates depicted as circles.

If at block 506 it is decided that a further value is to be determined, process flow 500 follows closed loop 508 for repeating blocks 502, 504. If at block 506 it is decided that all values have been acquired, process flow 500 goes to block 510. At block 510, a parameterized function is fitted to the determined values. In the example shown in FIG. 5B, the parameterized function is shown as function 554 corresponding to the equation:

$$y = Mx^{-p},$$

wherein y corresponds to cumulative wear rate 556, x corresponds to tape head usage 558, and M and p corresponds to parameters for fitting the parameterized function. Fit parameters M and p may depend, among other factors, on (i) the specific characteristics of the tape head (e.g., materials and design), (ii) the specific characteristics of the cartridges used in the test, and (iii) the conditions under which the test is performed (e.g., temperature and humidity). A parameterized function in the form as parameterized function 554 facilitates predicting condition of the tape head with a high accuracy. By way of example, under certain circumstances, parameterized function 554 facilitates estimating values of cumulative wear with an error less than 2%. It will be understood that a model as shown in FIG. 5B may be analogously constructed for other condition parameters such as magnetic spacing change or error rate drift.

A parameterized function as described herein may be fitted using the method of least squares or using any other suitable fitting method. In the example depicted in FIG. 5B, curve 560 is constructed based on the fitting of the above parameterized function with determined values 552. In this example, a wear model 562 is constructed that includes fitted curve 560. A model associating condition with usage as described herein may include further fitted curves, each fitted curve being constructed by performing process flow 500 for different test heads, as illustrated below with respect to FIGS. 6A and 6B.

At block 514, a model determined at block 510 may be stored. For example, looking back at FIG. 4A, condition determination engine 402 may store data related to the fitted function (e.g., values of parameters M and p) as part of model data 406. Process flow 500 may further include determining an expected operating life of a tape head design class based on the determined model. For example, it may be determined that a particular design class of tape heads is not reliable when cumulative wear rate is below 2 nm/cartridge. In the depicted example, and according to wear model 562, this cumulative wear rate limit is reached after 20 cartridges are read/write by a tape head of this design class. It will be understood that these limit values corresponding to an expected operating life are merely for illustrative purposes. Further, such limit values may be determined analogously for other condition parameters such as, for example, magnetic spacing change, error rate drift, block error rate, CSNR, BBSNR, or read element resistance.

According to some examples herein, it may be determined whether an actual value of a condition parameter related to performance of the tape head is outside a range. The determination is performed using (i) determined values of a condition parameter (e.g., magnetic spacing change or error rate drift), and (ii) a wear model associating tape head condition with tape head usage. Values of the condition parameter that lie outside the range may be indicative of an abnormal condition of the tape head. A pro-active determination of an abnormal condition of the tape head facilitates anticipating correction measures (e.g., tape head replacement) before a failure occur.

In one example of pro-active determination of an abnormal condition, a model associating tape head condition with tape head usage, such as a wear model 562 in FIG. 5B, may be pre-determined for a design class of tape heads. Then, during operation of a tape head, a value of a condition parameter may be determined after a specific usage time using an online measurement (e.g., a measurement of magnetic spacing or error rate). Then, the determined value may be compared with the model. If the determined value differs from a predicted condition beyond a particular threshold, then condition of the tape head is determined to be abnormal.

A range for establishing an abnormal condition may be determined in different manners. For example, such a range may be determined to correspond to a specific deviation from a predicted condition, e.g. a ±5% deviation from a value of the condition parameter predicted for the particular usage time by a corresponding model. In another example, such a range is established using pre-determined test data of a plurality of test tape heads determined during respective test procedures. Using such pre-determined test data, a lower limit and an upper limit may be determined for a particular condition parameter, as illustrated below with respect to FIGS. 6A and 6B.

Figure 6A:
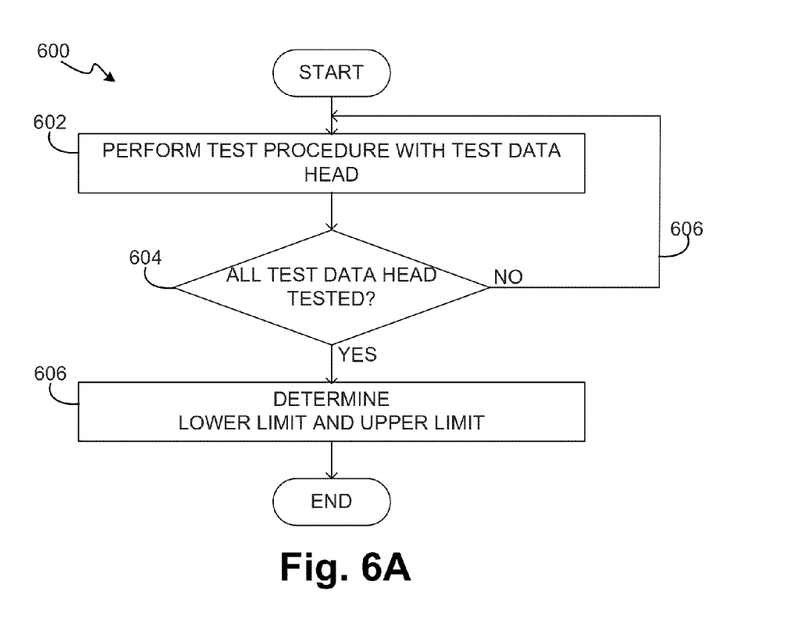
FIG. 6A is a diagram depicting a process flow for determining an upper limit and a lower limit for a condition parameter

FIG. 6A is a diagram depicting a process flow 600 for determining a lower limit and an upper limit for values of a condition parameter at specific usage intervals of the tape head. The depicted process flow 600 may be carried out by execution of sequences of executable instructions. In an example, the executable instructions are stored in a tangible machine readable storage medium such as, but not limited to, memory device 410. Process flow 600 may be carried out by processor 412. Model determination engine 403 may be responsible for implementing process flow 600. Condition determination engine process flow 600 may be carried out associated with manufacturing of tape drives so as to determine lower and upper limits for a specific design class of tape heads.

Figure 6B:
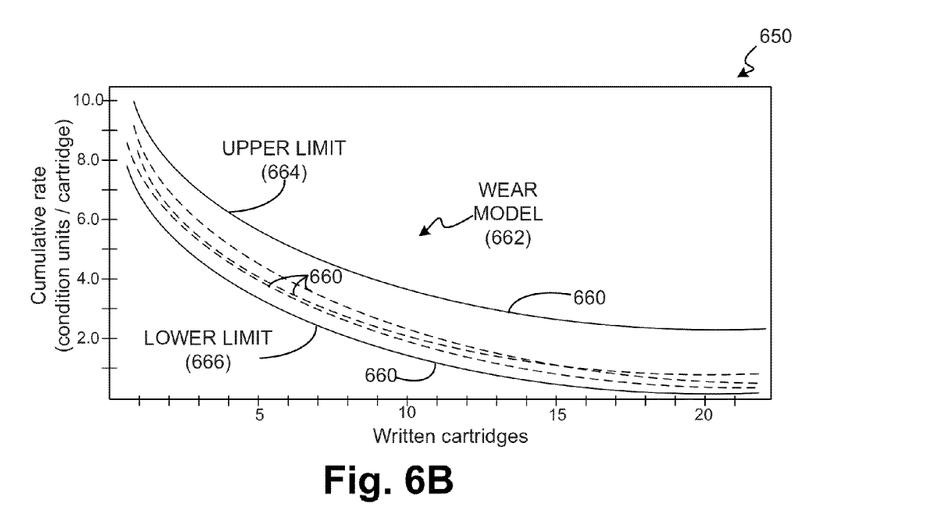
FIG. 6B is a graph schematically showing a model fitting determined test values according to another example.

In the following, process flow 600 is described with reference to elements depicted in FIG. 6B, which depicts a graph 650 schematically showing a wear model 662 including a plurality of curves 660, each curve being build with wear data from a test tape head analogously as described above with respect to FIG. 5B. Note that FIG. 6B does not depicts wear data for the sake of clarity. Although FIG. 6B illustrates a model of tape head wear as condition parameter, it will be understood that process flow 600 may be analogously performed for determining lower and upper limits associated with other condition parameters (e.g., magnetic spacing change or error rate drift).

At block 602 a test procedure is performed for a test data head. Block 602 may be performed by executing process flow 500 for the test data head. For example, by performing block 602, a curve 660 fitting determined cumulative wear rate (not shown in FIG. 6B for the sake of clarity) of the test head may be determined. At block 604 it is evaluated whether a further test data head should be tested according to block 602. Generally, the number of tested tape heads is chosen depending on the desired accuracy for predicting condition of a tape head in the same design class. Performing a test procedure for a number of test data heads between 10 and 20, such as 15, facilitates constructing a model associating tape head condition with tape head usage with a suitable reliability.

If at block 604 it is decided that a further test data head is to be performed, process flow 600 follows closed loop 606 for repeating block 602 with a different test data head. If at block 604 it is decided that all required test data heads are tested, process flow 600 goes to block 606. At block 606 a lower limit and an upper limit are determined In the example depicted in FIG. 6B, a lower wear limit 664 and an upper wear limit 666 are determined These limits include limit values of cumulative wear rate associated with specific tape head usage intervals through curves constructed by fitting a parameterized function (e.g., parameterized function 554) with wear data from test tape heads. In the depicted examples, each of lower wear limit 664 and upper wear limit 666 correspond to values from a single curve derived from a single test data head since these curves represent the outer limits to all constructed curves 660. It should be noted that an outer limit can include overlapping curves constructed from different test data heads, the overlapping curves being an outer limit to all constructed curves 660.

Figure 7A:
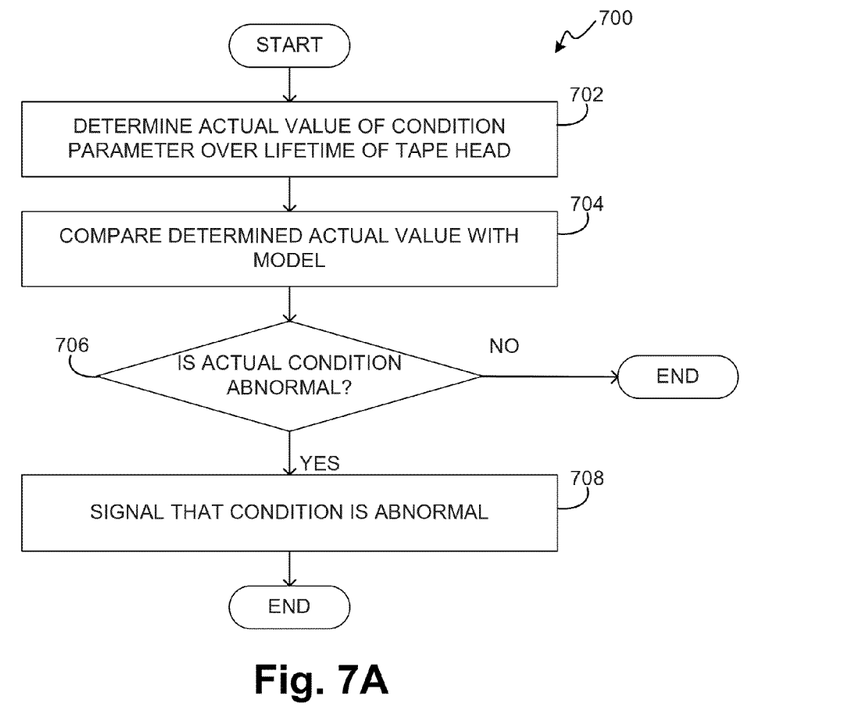
FIG. 7A is a diagram depicting a process flow for determining an abnormal condition of a tape head.
Figure 7B:
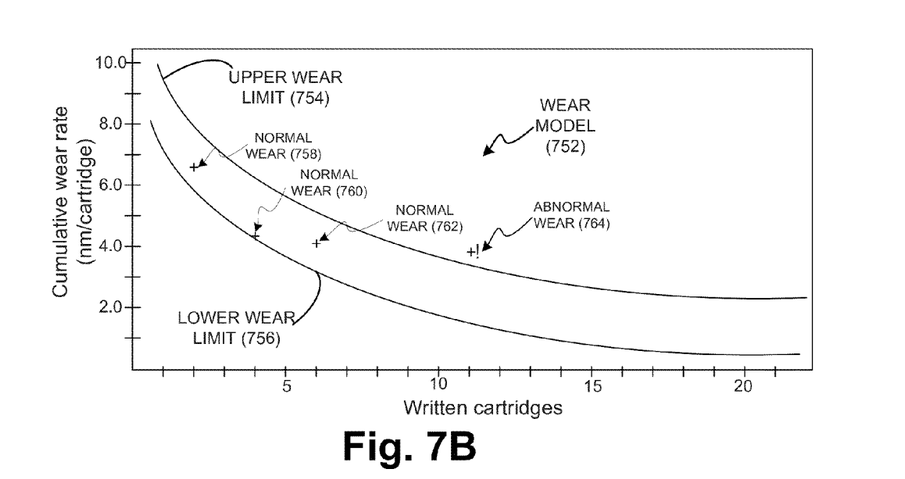
FIG. 7B is a graph schematically showing a model associating a condition parameter with tape head usage according to another example.

According to some examples, and as set forth above, condition of a tape head may be determined by comparing condition data determined during the operating life of a tape head with a model associating tape head condition with tape head usage. More specifically, such a comparison may be performed using a model (e.g., wear model 662) to determine whether condition of the tape head is outside a particular expected range, e.g., a wear range within upper wear limit 664 and lower wear limit 666 in FIG. 6B. If the actual condition of the tape head is outside the expected condition range, an abnormal condition of the tape head is established. FIGS. 7A and 7B illustrate such examples.

FIG. 7A is a diagram depicting a process flow 700 for determining whether an actual condition of a tape head is abnormal. Components of the system depicted in FIG. 8 may be responsible for implementing block 702. Condition determination engine 402 (see FIG. 4A) may be responsible for implementing blocks 704 to 710. In discussing FIG. 7A, reference is made to the diagrams of FIGS. 7B to 9 to provide contextual examples. It will be understood that implementation of process flow 700 is not limited to those examples. Process flow 700 may be performed at pre-determined servicing intervals for evaluating wear of a tape drive during its operational life. Alternatively, or in addition thereto, process flow 700 may be manually triggered, for example, when a tape drive user has indicia that performance of the tape drive is abnormal. Alternatively, or in addition thereto, process flow 700 may be triggered by an external host system, e.g., a system from a manufacturer of the tape drive, for evaluating whether a particular tape drive may require servicing. For example, such external host system may trigger process flow 700 periodically.

At block 702 a value of a condition parameter (e.g., tape head wear, magnetic spacing change, or error rate drift) is determined over the lifetime of the tape head. Hereinafter, such a value is referred to as an actual value. Actual values of a condition parameter may be determined in different manners. According to an example, actual wear data is determined using measurements performed while the tape head is in the magnetic tape drive. For example, actual wear data can be determined using measurements of magnetic spacing, error rate drift, or combinations thereof.

In some specific examples, at block 702, a cumulative rate associated with a parameter of the tape head is determined. Such a cumulative rate may be particularly suitable for constructing a model as described herein by using a parameterized function in the form as described above. The tape head parameter may be, for example, a parameter such as a tape head wear, a magnetic spacing change, or an error rate drift. A cumulative rate as used herein refers to the amount of change in the value of the tape head parameter, the change being caused by the cumulative effect of tape head usage. For example, the cumulative rate is associated with tape head wear and generally refers to the erosion increase at the tape head caused by reading and/or writing a tape. Such cumulative rate may be expressed as tape head erosion per usage unit (e.g., 20 nm/cartridge). In another example, the cumulative rate is associated with magnetic spacing change and generally refers to the increase in magnetic spacing due to an increase in tape flying height (described below with respect to FIG. 9). Such cumulative rate may be expressed as a signal amplitude change per usage unit. In other example, the cumulative rate is associated with error rate drift (e.g., a change in bit error rate) and generally refers to the increase in error rate (BER) due to wear of a tape head. Such cumulative rate may be expressed as an increment of error rate per usage unit. Analogously, a cumulative rate may be associated with a change in CSNR, BBSNR, or head resistance.

Figure 8:
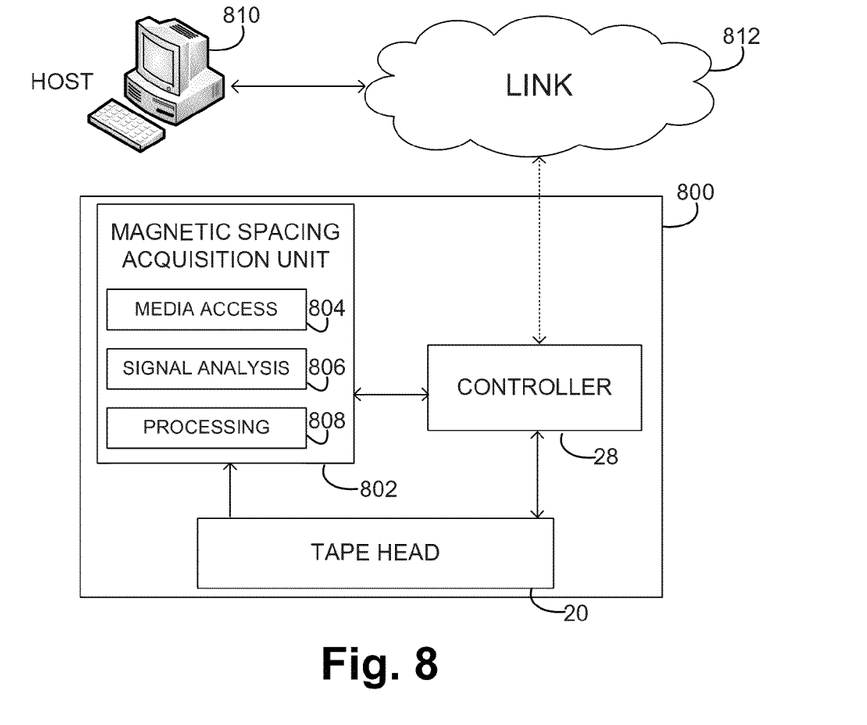
FIG. 8 depicts an environment in which examples may be implemented.

Looking ahead to FIG. 8, an example of a system 800 is illustrated that facilitates measurements for determining an actual value of a condition parameter. More specifically, the example in FIG. 8 illustrates a system for measuring magnetic spacing. It will be understood that analogous systems may be used for measuring other variables associated with a tape head in order to determine actual values of a condition parameter. For example, such systems may be adapted to measure an error rate or a tape head resistance.

In FIG. 8, a magnetic tape drive 800 includes a magnetic spacing acquisition unit 802 operatively coupled to controller 28 and tape head 20. Magnetic spacing acquisition unit 802 generally includes a set of components suitable for acquiring and processing magnetic spacing between tape head 20 and tape 12. For example, magnetic spacing acquisition unit 802 may include a media access component 804, a signal analysis component 806, and a processing component 808. It will be understood that magnetic spacing acquisition unit 802 is not necessarily integrated in magnetic tape drive 800. Magnetic spacing acquisition unit 802 can be embodied by a dedicated testing system that is connected to magnetic drive 800 for acquiring magnetic spacing as described above. Further, the single components of magnetic spacing acquisition unit 802 may not be formed in a single apparatus. These components may be provided in different units that are interconnected for performing the functions mentioned below.

Media access component 804 is an electronic arrangement suitable for reading information from tape 12 through tape head 20. Media access component 804 may be constructed similarly as a read arrangement of a common tape drive. As an alternative to media access component 804, magnetic spacing acquisition unit 802 may be operatively connected to the read arrangement of magnetic tape drive 800 for accessing data in tape 12. Signal analysis component 806 is an electronic arrangement suitable for measuring magnitude versus frequency of a signal acquired by media access component 804 (hereinafter referred to as tape head signal). Signal analysis component 806 may include a spectrum analyzer or a signal processor engine configured to perform fast Fourier transformation of a tape head signal. Processing component 808 is, generally, a combination of hardware and programming configured to perform calculations related to magnetic spacing and tape head wear based on data generated by signal analysis component 806 as described in the following. The programming of processing component 808 may be processor executable instructions stored on a tangible memory medium, and the hardware may include a processor.

Figure 9:
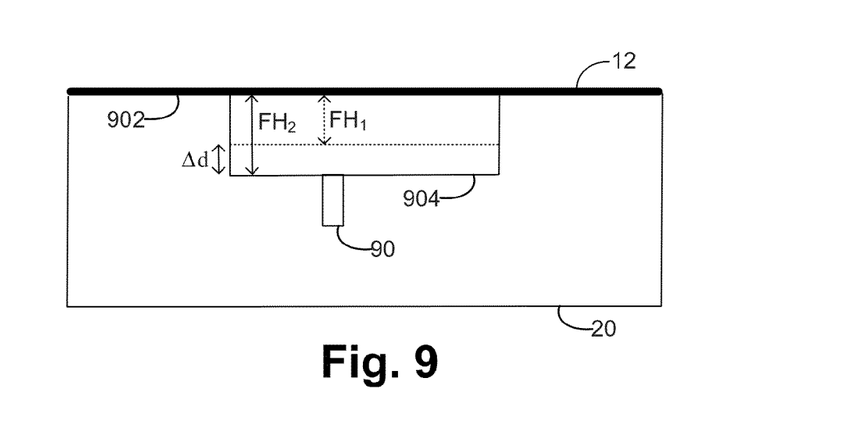
FIG. 9 is a diagram schematically illustrating an example of an arrangement related to a magnetic spacing measurement.

Looking ahead, FIG. 9 illustrates a tape head 20 in operation for reading or writing data separated a certain distance from tape 12. This distance is referred to as tape flying height. Tape flying height is generally determined by the vertical distance between a tape bearing surface 902 and a pole tip surface 904 of tape head 20. As depicted in the Figure, the tape flying height may change due to, among other factors, wear of tape head 20. In particular, wear of tape head 20 may cause a pole tip recession $\Delta d$. It should be noted that tape flying height might change due to other factors such as debris formation in the interface between tape 12 and tape head 20. Different parameters associated with tape head 20 may be used to determine whether a change in tape flying height is caused by tape head wear. For example, head resistance may be monitored to determine whether a tape flying height change is associated with tape head wear and not to other factors such as accumulation of debris in the interface between the tape head and the tape. (It should be noted that wear of a tape head generally results in a change of head resistance.)

The tape flying height $FH_1$ of a fresh tape head 20 (depicted by a dotted line) is generally smaller than the tape flying height $FH_2$ of a used tape head 20 (depicted by a solid line). If other effects that may affect tape flying height (e.g., debris accumulation) are neglected, the cumulative wear $\Delta d$ corresponds to the difference between both tape flying heights $FH_1$ and $FH_2$. Tape flying height can be determined using different parameters. For example, tape flying height is correlated with the magnetic spacing MS, i.e., the separation between a transducer element 90 in tape head 20 and a read magnetic portion of tape 12. Magnetic spacing MS can be quantified using the Wallace equation, which reads $$\text{Amplitude} = e^{-2\pi MS/\lambda},$$

where Amplitude is the amplitude of a signal acquired from reading data tape and $\lambda$ is wavelength of the signal. There is a variety of methods for inferring the magnetic spacing from the Wallace equation. For example, the signal analysis component 806 may acquire an equalized response from a signal acquired by reading data from tape head 12. Signal analysis component 806 may then generate data relating magnitude of the signal to its frequency. This data may be processed by processing component 808 for inferring the magnetic spacing MS. Processing component 808 may correct the determined magnetic spacing values in view of factors that may affect the measurement such as, for example, changes in ambient conditions. This process may be repeated at different stages of usage of tape head 20 in order to determine cumulative wear rates.

Therefore, a magnetic spacing measurement may be used to determine a condition parameter of a tape head. For example, a magnetic spacing change may be derived in a straightforward manner using magnetic spacing measurements at different usage intervals. Further, a cumulative wear rate may be derived using magnetic spacing measurements at different usage intervals and inferring wear from the Wallace equation as set forth above. It will be understood that actual values of condition parameters may be determining by other means. For example, tape head 20 may be removed from drive 800 and a surface characterization method, such as AFM, may be performed to determine wear of the data head. In other examples, an error rate measurement or a tape head resistance may be performed. Using such measurements at different usage intervals a change rate of these condition parameters may be derived.

Returning to FIG. 7A, at block 704 an actual value determined at block 702 is compared with a model associating condition with usage. At block 706, it is evaluated whether an actual condition of the tape head is abnormal. For performing the comparison, an actual value determined after a specific usage interval (e.g., after write/read of five cartridges or after a usage time of 6 hours) may be compared with a range that indicates normal condition of the tape head at that specific usage interval. For example, such a range may be derived using a model as described above, in particular from limiting values of the model corresponding to that specific usage interval.

FIG. 7B illustrates a particular example for comparing actual values of a tape head using a wear model 752 and evaluating whether a tape head condition is abnormal. Wear model 752 includes an upper wear limit 754 and a lower wear limit 756 in the form of curves associating cumulative wear rates with usage. Four wear measurements 758, 760, 762, 764 are depicted as crosses. Wear measurements 758, 760, 762 (labeled as 'normal wear') are within upper wear limit 754 and lower wear limit 756 (i.e., comprised in a region between both curves such that each measurement is comprised within the values of these curves at the particular usage intervals). Wear measurements 764 (labeled as 'abnormal wear') is outside the range defined by upper wear limit 754 and lower wear limit 756 at the particular usage interval. In this particular example, wear measurement 764 indicates a cumulative wear rate higher as predicted by wear model 752. Generally, such a higher actual cumulative wear indicates a higher tape head wear. In this example, when wear measurement 764 is detected, an abnormal condition of the tape head is established. It will be understood that other condition parameters (e.g., magnetic spacing change or error rate drift) may be used in an analogous manner as shown in FIG. 7B for determining whether condition of a tape head is normal or abnormal.

If at block 706 it is determined that condition is normal, process flow 700 may be terminated. If at block 706 it is determined that condition is abnormal, process flow 700 may go to block 708. At block 708 an abnormal condition is signaled (e.g., sending a system to a host system that wear of the tape head is higher as expected). Signaling may be performed only when the abnormal condition is beyond a specific threshold. For example, an abnormal condition may be signaled when a determined actual value of a condition parameter deviates at least 5% from an expected value. Further, signaling may include severity of the abnormality. For example, a moderate abnormal condition signal may be generated when actual values deviate below 50% from expected values; a severe abnormal condition signal may be generated when actual values deviates over 50% from expected values. Thereby, the response to a determined abnormal condition may be adapted to the signaled severity. Further, signaling may be performed only when the abnormal condition is associated with an abnormal condition from the tape that may compromise reliability of the tape head. For example, if the abnormal condition is associated with an excessive wear of the tape head, the abnormality may be signaled so that proper measures may be undertaken (e.g., exchanging the tape head). However, if the abnormal condition is associated with a wear lower as expected, the system may refrain from signaling the abnormality. Alternatively, the system may signal that wear is lower as expected so that the tape head could be eventually used longer as pre-determined by its warranty.

Condition determination engine 402 may be responsible for causing generation of a signal at block 708. The signal may be sent to a suitable interface that renders the signal to a user of tape drive 800. Alternatively, or in addition thereto, condition determination engine 402 may cause sending a signal to a host device 810 through a link 812. Host device 810 may be deployed on-premise of a supplier or an administrator of tape drive 800. Thereby, a supplier or an administrator of tape drive 800 may notice an abnormal condition of the tape head and pro-actively react so as to prevent failure of a tape head.

FIGS. 7A and 7B are illustrated above with respect to a magnetic space measurement for determining an actual value of a condition parameter of the tape head. It will be understood that other tape head parameters may be used for implementing process flow 700 such as, bit error drift, or a change in CSNR, BBSNR, or head resistance. For example, tape drive 800 may include an encoding scheme with built-in redundancy that tape drive 800 may use to measure rates associated with write/read errors "on the fly". Further, tape drive 800 may include an impedance circuit operatively connected to tape head 20 so as to measure head resistance.

It will be appreciated that embodiments can be realized in the form of hardware, software module or a combination of hardware and the software module. Any such software module, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a non-transitory computer-readable storage medium that are suitable for storing a program or programs that, when executed, for example by a processor, implement embodiments. Accordingly, embodiments provide a program comprising code for implementing a system or method as claimed in any preceding claim and a non-transitory computer readable storage medium storing such a program.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations.

What is claimed is:

1. A method for predicting condition of a tape head for use in a magnetic tape drive, the method comprising:
determining a condition of the tape head using a model associating a condition parameter with tape head usage, the condition parameter being related to performance of the tape head, the model fitting pre-determined values of the condition parameter, and the model being a representation of the tape head that allows for determining tape head condition after a specific tape head usage without having to measure an actual value of the condition parameter.

2. The method of claim 1, wherein the condition parameter is associated with at least one of a tape head wear, a magnetic spacing, and an error rate.

3. The method of claim 1, wherein the model is a predetermined model constructed by fitting a parameterized function with values of the condition parameter determined during a test procedure performed on a test tape head.

4. The method of claim 3, wherein the parameterized function includes the function:

$$y=Mx^{-p},$$

y corresponding to a rate of the condition parameter,
x corresponding to a number of written cartridges, and
M and p corresponding to parameters for fitting the parameterized function.

5. The method of claim 3, wherein:
the test procedure includes writing data on a plurality of fresh tapes using the test tape head; and
determining values of the condition parameter at selected intervals during the test procedure.

6. The method of claim 3, wherein the values of the condition parameter are determined using atomic force microscopy measurements.

7. The method of claim 1, wherein the determined condition of the tape head includes an expected operating life of the tape head.

8. The method of claim 1 further comprising determining an actual value of the condition parameter over a lifetime of the tape head.

9. The method of claim 8, wherein the actual value is determined using a magnetic spacing measurement, an error rate drift measurement, a tape head resistance measurement, or a combination thereof.

10. The method of claim 8, further including using the determined actual value for comparing an actual condition of the tape head with the model to determine whether the actual condition of the tape head is abnormal.

11. The method of claim 8, wherein:
the model is pre-determined using a plurality of test tape heads;
the model includes a lower limit and an upper limit for values of a condition parameter at a specific usage interval of the tape head; and
the method further includes determining an abnormal condition of the tape head when an actual value of the condition parameter is outside of the lower limit and the upper limit.

12. An apparatus comprising:
a magnetic tape drive including is tape head to access content of a storage tape;
a processing circuit to determine whether an actual value of a condition parameter related to performance of the tape head is outside a range using a model associating tape head condition with tape head usage,
wherein the model fits pre-determined values of the condition parameter, and wherein the model is a representation of the tape head that allows for determining tape head condition after a specific tape head usage without having to measure an actual value of the condition parameter.

13. The apparatus of claim 12, wherein the condition parameter is associated a tape head wear, a magnetic spacing, or an error rate.

14. The apparatus of claim 12, the processing circuit to periodically determine actual values of the condition parameter by processing a magnetic spacing measurement or an error rate drift.

15. The apparatus of claim 12, the processing circuit to generate an alert signal upon determining that an actual value of the condition value is outside the range.

16. The apparatus of claim 12, wherein the model is a pre-determined model constructed by fitting a parameterized function with values of the condition parameter from a test procedure performed on a test tape head.

17. The apparatus of claim 12, wherein:
the model is pre-determined using a plurality of test tape heads
the model includes a lower limit and an upper limit for values of the condition parameter at a specific usage interval of the tape head; and
the processing circuit to determine an abnormal condition of the tape head when an actual value of the condition parameter is outside the lower wear rate limit and the upper wear rate limit.

18. A non-transitory tangible computer readable storage medium storing instructions that when executed by a computer cause the computer to implement a method to:
determine a cumulative rate associated with a parameter of the tape head, the tape head being for use in a magnetic tape drive, the parameter being a tape head wear, a magnetic spacing, or an error rate;
determine whether the cumulative rate is within a selected range using a model associating the tape head parameter with the parameter value, wherein the model fits pre-determined values of the condition parameter, and wherein the model is a representation of the tape head that allows for determining tape head condition after a specific tape head usage without having to measure an actual value of the condition parameter; and
signal an abnormal condition of the tape head upon determining that the cumulative rate is outside the selected range.

19. The medium of claim 18, wherein:
the model is pre-determined using a plurality of test tape heads;
the model includes a lower limit and an upper limit for values of a condition parameter at a specific usage interval of the tape head; and
the method further includes determining an abnormal condition of the tape head when an actual value of the condition parameter is outside of the lower limit and the upper limit.

20. The medium of claim 18, wherein the model is a pre-determined model constructed by fitting a parameterized function in the form:

$$y = Mx^{-p},$$

y corresponding to the cumulative rate associated with the parameter of the tape head,
x corresponding to a number of written cartridges, and
M and p corresponding to parameters for fitting the parameterized function.

* * * * *

UNITED STATES PATENT AND TRADEMARK OFFICE
CERTIFICATE OF CORRECTION

| | | |
|---|---|---|
| PATENT NO. | : 8,570,678 B2 | Page 1 of 1 |
| APPLICATION NO. | : 13/299602 | |
| DATED | : October 29, 2013 | |
| INVENTOR(S) | : Brian Brong et al. | |

It is certified that error appears in the above-identified patent and that said Letters Patent is hereby corrected as shown below:

In the Claims:

In column 15, line 34, in Claim 12, delete "is" and insert -- a --, therefor.

In column 15, line 47, in Claim 13, delete "associated" and insert -- associated with --, therefor.

In column 16, line 29, in Claim 18, delete "haying" and insert -- having --, therefor.

Signed and Sealed this
Eleventh Day of February, 2014

Michelle K. Lee
*Deputy Director of the United States Patent and Trademark Office*